Figure 1:
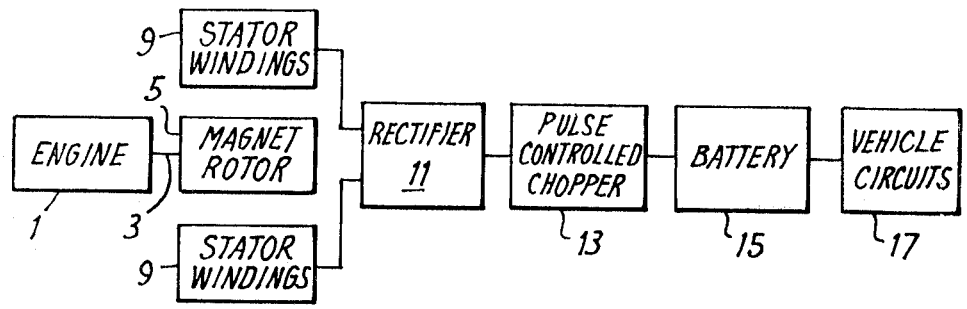

United States Patent [19]

Gurwicz

[11] 4,281,279
[45] Jul. 28, 1981

[54] CHOPPER-CONTROLLED ALTERNATOR FOR BATTERY CHARGING

[75] Inventor: David Gurwicz, Gateshead, England

[73] Assignee: NADA Electronics Limited, Tyne & Wear, England

[21] Appl. No.: 6,237

[22] Filed: Jan. 24, 1979

[30] Foreign Application Priority Data

Jan. 24, 1978 [GB] United Kingdom ................. 2865/78
Jan. 4, 1979 [GB] United Kingdom .................... 212/79

[51] Int. Cl.³ .............................................. H02J 7/04
[52] U.S. Cl. ................. 320/45; 307/10 BP; 320/40; 320/59; 363/124
[58] Field of Search .................. 307/10 R, 10 BP; 320/40, 45, 59, 32, 61, 57, DIG. 1, DIG. 2; 363/124, 41

[56] References Cited

U.S. PATENT DOCUMENTS

| | | | |
|---|---|---|---|
| 3,443,197 | 5/1969 | Raver et al. | 320/DIG. 1 |
| 3,755,729 | 8/1973 | Kuttner | 320/40 X |
| 3,875,490 | 4/1975 | Ackermann | 320/40 |
| 3,919,617 | 11/1975 | Tippett et al. | 320/40 X |
| 3,925,714 | 12/1975 | Sherman, Jr. | 320/32 X |
| 4,082,097 | 4/1978 | Mann et al. | 320/32 X |
| 4,123,692 | 10/1978 | Gilmore et al. | 363/41 |
| 4,152,635 | 5/1979 | Scott, Jr. | 320/32 X |

*Primary Examiner*—William M. Shoop
*Attorney, Agent, or Firm*—Browdy and Neimark

[57] ABSTRACT

An alternator for an internal combustion engine driven vehicle comprises a permanent magnet rotor mounted in operation for rotation with the engine crankshaft, a wound stator within which the rotor extends, rectifying means connected to the output of the stator, and a pulse controlled DC chopper regulator supplied from the output of the rectifier means and adapted to control the output from the rectifier and to supply the so controlled output to the vehicle battery for charging thereof.

6 Claims, 2 Drawing Figures

CHOPPER-CONTROLLED ALTERNATOR FOR BATTERY CHARGING

This invention relates to alternators for internal combustion engine (hereinafter also referred to as "IC engine") driven vehicles. The customary form of alternators employed in internal combustion engine driven vehicles includes a wound rotor supplied with electric current from the vehicle battery by way of a regulator and slip rings and brushes. The rotor is spun by the vehicle engine to provide a rotating magnetic field which intersects the stator windings to produce an EMF in said windings which is supplied to a rectifier the rectified output of which supplies the vehicle circuits and is also returned to the vehicle battery to effect charging thereof. It will be appreciated that the regulator controlling the supply of battery current to the rotor is required to maintain a regulated charging supply to the battery notwithstanding changes in engine speed.

The use of wound rotor alternators in motor vehicles is uneconomic because the wound rotor construction is expensive. Also, the effectiveness of such rotors has a tendency to be short-lived particularly in large vehicles where there is a good deal of vibration which is harmful to the sliding contact required between the carbon brushes and slip rings.

It is, accordingly, an object of the present invention to provide an improved alternator for IC engine driven vehicles which is, in operation, less affected by vibration than is the conventional wound rotor type of alternator.

The present invention includes an alternator for an internal combustion engine driven vehicle, comprising a permanent magnet rotor adapted to be mounted for rotation with a vehicle engine crankshaft, a wound stator within which the rotor extends, rectifier means connected to the output of the stator and adapted to convert the stator output to DC and a pulse controlled DC chopper regulator connected at the input thereof to the DC output of the rectifier means and adapted to control the output from the rectifier and to supply said controlled output to the vehicle battery for charging thereof. Means are provided for regulating the mark/space ratio of the DC chopper in dependence upon the required charging rate of the battery.

Figure 2:
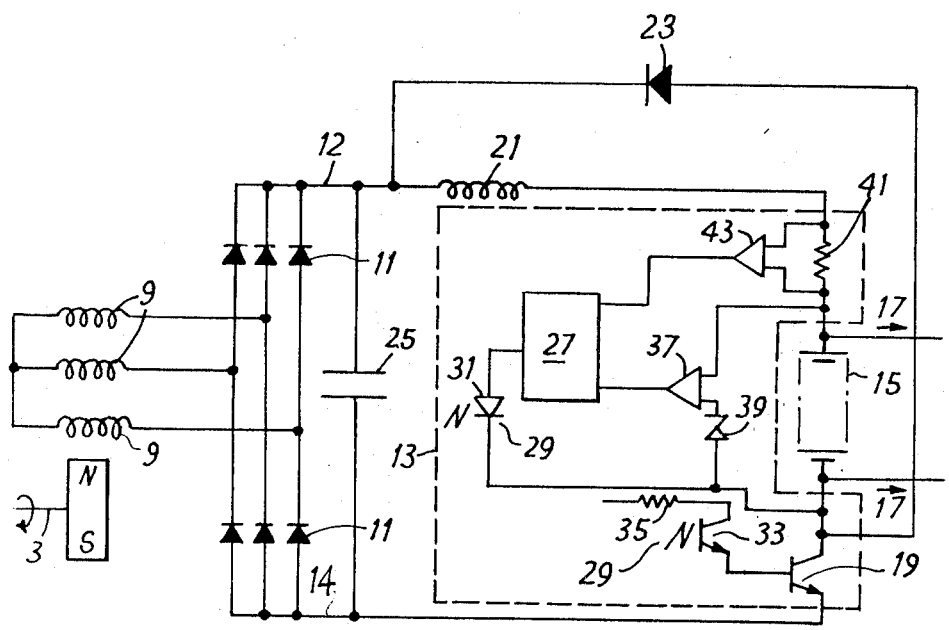

The invention will now be described, by way of example, with reference to the accompanying drawings in which:

FIG. 1 is a block diagram of an alternator for an IC engine driven vehicle according to the invention; and FIG. 2 is a drawing showing some of the circuit details of the alternator of FIG. 1.

In the drawings like parts are accorded the same reference numerals.

Referring to FIG. 1, a vehicle IC engine 1 has a crankshaft 3 to which is connected a permanent magnet rotor 5 of an alternator generally indicated by the reference numeral 7.

Phase windings 9 of the stator of the alternator within which the rotor 5 extends are provided in which three-phase current is generated by virtue of the rotation of the permanent magnet rotor. The stator windings are connected by way of a rectifier 11 to a pulse controlled DC chopper regulator 13 which is employed to control the supply of DC current from the rectifier to the vehicle battery 15. The battery is connected to drive various vehicle circuits 17. The DC chopper 13 may be a transistor or thyristor chopper. As will be seen, a transistor chopper is employed in the circuit of FIG. 2.

Referring now to FIG. 2, it will be seen the the stator windings 9 are connected in a star arrangement. The windings 9 are connected by way of the rectifier 11, which is in the form of a bridge rectifier, to rails 12 and 14. Across the bridge rectifier, i.e. between rails 12 and 14, there are connected in series the vehicle battery 15 and a main transistor 19 of the DC chopper regulator 13, which is shown enclosed in broken lines. Also disposed in series with the battery 15 and main transistor 19 is an inductor 21, there being connected in parallel with the inductor and battery a freewheel diode 23, which maintains current through the inductor 21 during interpulse periods of the transistor 19, that is to say, during periods when that transistor is in a non-conducting condition. Directly across the battery 15 are provided leads which connect with the vehicle circuits 17. Connected in parallel with the output of the bridge rectifier 11 and with the series path of the battery 15, transistor 19 and inductor 21 is a capacitor 25 which smooths the DC output of the bridge 11 and provides a low impedance path for transient current pulses occurring whenever the main transistor 19 is turned off. The capacitor 25 also provides a voltage source for charging the battery 15.

The DC chopper regulator 13 includes a pulse generating circuit 27 of well known form which controls the mark/space ratio of the transistor 19. To this end, the circuit 27 switches the transistor 19 on and off by way of an optical isolator 29 having a light emitting diode 31 connected to the output of circuit 27 and which, when illuminated by an output pulse from circuit 27, renders conducting a phototransistor 33 which is powered from an independent auxiliary supply voltage connected by way of a resistor 35 to the collector of transistor 33. The emitter of phototransistor 33 is connected to the base electrode of transistor 19, the collector to the emitter part of which is disposed in series with the vehicle battery 15. The supply of energising pulses from the pulse generating circuit 27 to the light emitting diode 31 of the optical isolator 29 is controlled by the required charging rate of the battery. Accordingly, there is connected across the battery a comparator amplifier 37 one input of which is connected with the positive terminal of the battery whilst the other input is connected to the negative terminal of the battery by way of a Zener diode 39 which provides a reference voltage input to the amplifier 37, the output of which is connected with the circuit 27. When the battery voltage falls the output voltage from the comparator amplifier 37 causes circuit 27 to supply pulses at increased frequency to the light emitting diode 31 with the result that the mark/space ratio of transistor 19 is increased thereby to increase the mean charging current to the battery 15. Conversely, the mean charging current to the battery is diminished as the battery voltage approaches the full charge voltage.

The pulse generating circuit 27 is further under the control of current flow into the battery. This is achieved by means of a current shunt 41 disposed in series with the battery 15 and connected at opposite ends thereof to respective inputs of an amplifier 43 which, as with amplifier 37, is in the form of an integrated circuit. The output of amplifier 43 is connected with the pulse generating circuit 27. The shunt 41 monitors current flow into the battery 15. When the current through the shunt 41 exceeds a predetermined value the output of amplifier 43 causes the pulse generating circuit to reduce the frequency of pulses supplied to the light emitting diode 31 so that transistor 19 conducts with a reduced mark/space ratio which limits the battery current.

In operation of the alternator circuit illustrated in FIG. 2, as the vehicle circuits 17 draw power from the battery, the battery voltage drops from full charge value thereof and charging of the battery then takes place under the control of the chopper regulator 13. When the battery voltage nears its full charge value the mark/space ratio of the transistor 19 is diminished to reduce the mean charging current. In the event of a current surge into the battery which raises the charging current above a predetermined value, the mark/space ratio of transistor 19 is also reduced.

The form of IC engine driven vehicle alternator described above avoids the use of a wound rotor, which is expensive, and thus avoids the use of electrical contacts in the form of brushes and slip rings which are required for a wound rotor. Such contacts are vulnerable to vibration in the vehicle during operation.

I claim:

1. An alternator for an internal combustion engine driven vehicle, comprising a permanent magnet rotor adapted to be mounted for rotation with a vehicle engine crankshaft, a wound stator within which the rotor extends, rectifier means connected to the output of the stator and adapted to convert the stator output to DC, a pulse controlled DC chopper regulator connected at the input thereof to the DC output of the rectifier means and adapted to control the output from the rectifier and to supply said controlled output to the vehicle battery for charging thereof, and means for regulating the mark/space ratio of the DC chopper in dependence upon the required charging rate of the battery.

2. An alternator as claimed in claim 1, wherein the DC chopper regulator includes a transistor chopper connected, during operation, in series with the vehicle battery.

3. An alternator as claimed in claim 2, wherein the transistor chopper is connected, across the rectifier means, in series with an inductor and, during operation, with the battery, the inductor and the battery having a freewheel diode connected in parallel therewith.

4. An alternator as claimed in claim 1, wherein the DC chopper regulator includes a pulse generating circuit pulses from which control the mark/space ratio of the chopper regulator, there being provided means for controlling the frequency of pulses generated by the pulse generating circuit which include comparator means adapted to compare the battery voltage with a reference voltage and to provide an output which regulates the frequency of pulses produced by the pulse generating circuit.

5. An alternator as claimed in claim 1, wherein the DC chopper regulator includes a pulse generating circuit pulses produced by which control the mark/space ratio of the chopper regulator, the chopper regulator including current shunt means adapted to sense current flow into the battery said current shunt means being connected to an amplifier the output voltage of which controls the frequency of pulses generated by the pulse generating circuit when current through the current shunt means exceeds a predetermined value.

6. An alternator as claimed in claim 2, wherein the pulse controlled DC chopper regulator includes a pulse generating circuit pulses produced by which control the mark/space ratio of the transistor chopper there being provided optical isolator means which are energised by pulses from the pulse generating circuit and which, when energised, render conducting the transistor chopper.

* * * * *